United States Patent [19]

Harvey

[11] Patent Number: 4,994,830

[45] Date of Patent: Feb. 19, 1991

[54] TELE PAN CAMERA DATA BACK SHIFTS AND REDUCES PRINTED DATA WITH CHANGES IN MODE

[75] Inventor: Donald M. Harvey, Webster, N.Y.

[73] Assignee: Eastman Kodak Company, Rochester, N.Y.

[21] Appl. No.: 468,318

[22] Filed: Jan. 22, 1990

[51] Int. Cl.⁵ .............................................. G03B 17/24
[52] U.S. Cl. .................................................... 354/106
[58] Field of Search ........................................ 354/106

[56] References Cited

U.S. PATENT DOCUMENTS

| | | | |
|---|---|---|---|
| 3,490,844 | 1/1970 | Sapp | 355/40 |
| 4,001,850 | 1/1977 | Fujita | 354/219 |
| 4,183,645 | 1/1980 | Ohmura et al. | 354/106 |
| 4,208,713 | 6/1980 | Berg | 364/200 |
| 4,265,526 | 5/1981 | Ueda et al. | 354/106 |
| 4,361,388 | 11/1982 | Mlcak et al. | 354/106 |
| 4,402,588 | 9/1983 | Khait et al. | 354/106 |
| 4,583,831 | 4/1986 | Harvey | 354/106 |
| 4,639,111 | 1/1987 | Harvey | 354/481 |
| 4,647,170 | 3/1987 | Stoneham | 354/275 |
| 4,658,304 | 4/1987 | Tsunekawa et al. | 358/310 |
| 4,678,299 | 7/1987 | Harvey | 354/21 |
| 4,678,300 | 7/1987 | Beach | 354/21 |
| 4,682,870 | 7/1987 | Atkinson | 354/275 |
| 4,860,039 | 8/1989 | Hata et al. | 354/106 |
| 4,926,203 | 5/1990 | Hata et al. | 354/106 X |

Primary Examiner—Michael L. Gellner
Attorney, Agent, or Firm—Roger A. Fields

[57] ABSTRACT

Data printing device for a camera which takes normal and pseudo type images wherein the characters are printed near an edge of the selected image area in both the normal and pseudo modes, optionally with reduction in character size in the pseudo mode.

10 Claims, 2 Drawing Sheets

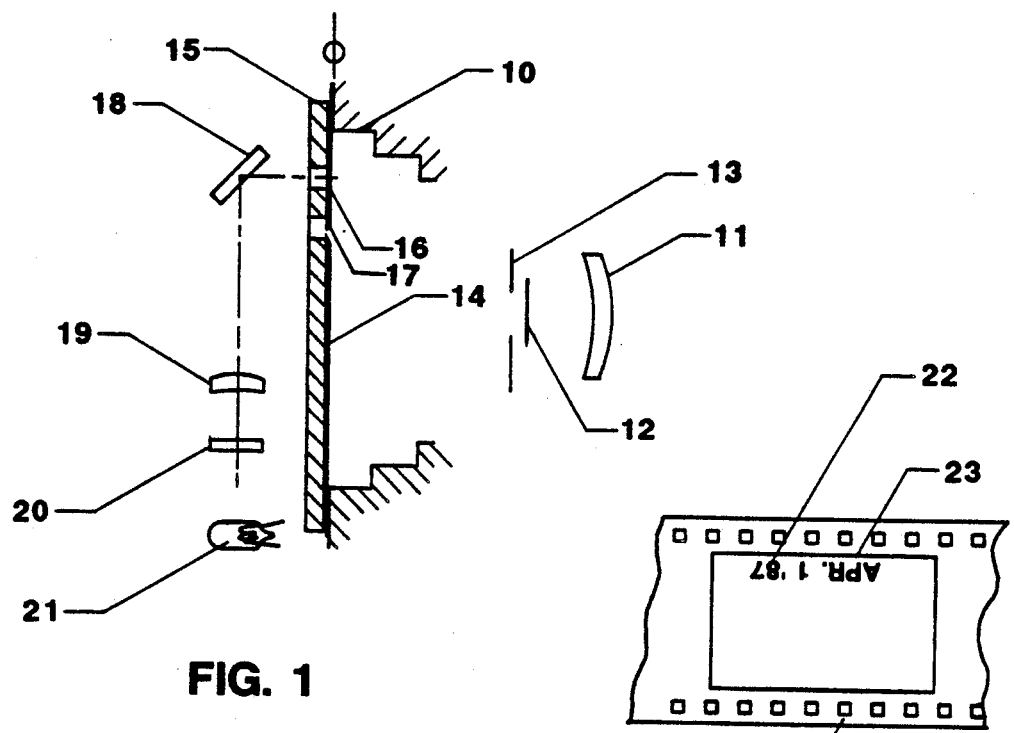
FIG. 1
FIG. 2
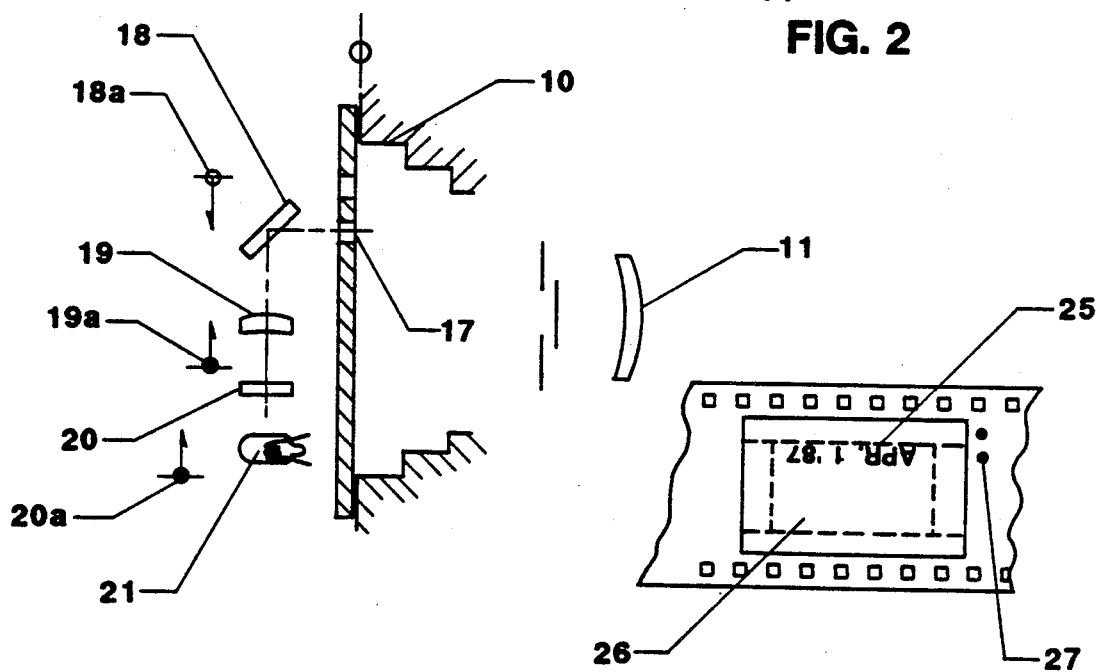
FIG. 3
FIG. 4

TELE PAN CAMERA DATA BACK SHIFTS AND REDUCES PRINTED DATA WITH CHANGES IN MODE

FIELD OF THE INVENTION

The invention relates to photography, and more particularly to a data printing device for cameras which make both normal and pseudo type photographs.

BACKGROUND - DESCRIPTION OF PRIOR ART

It is well known to provide camera devices which label the film with characters setting forth information about the particular photograph, such as date and time of the exposure. One patent disclosing such apparatus is U.S. Pat. No. 4,402,588 issued Sept. 6 1983. FIG. 7 of that patent shows an illuminated light emitting diode (LCD) character generator from which characters are projected onto the film by a light source. U.S. Pat. No. 4,183,645, issued Jan. 15, 1980 discloses another data printing device in a camera. U.S. Pat. No. 4,650,304, issued Mar. 17, 1987 discusses the taking of pseudo photographs.

A pseudo telephoto print is one that is made from a central portion of an exposure having the same width-to-length ratio, e.g. 3:5, as that of the exposure. During the printing process, the negative is masked at its upper, lower, left and right marginal zones, leaving the central portion of the negative unobscured. Alternatively, the film gate in the enlarger may be correspondingly masked or adjusted. Then, an enlargement is made of the central portion of the negative to provide a print with the same width-to-length ratio as that of the central portion. Thus, the print will have a telephoto or close-up format.

A pseudo panoramic print is one that is made from a narrow portion of an exposure having a greater width-to-length ratio, e.g., 1:3, than that of the exposure. During the printing process, the negative is masked at its upper and/or lower marginal zones, leaving the narrow portion of the negative unobscured. Alternatively, the film gate in the enlarger may be correspondingly masked or adjusted. Then an enlargement is made of the narrow portion of the negative to provide a print with the same width-to-length ratio as that of the narrow portion. Thus, the print will have a panoramic or elongate format.

SUMMARY OF THE INVENTION

According to the invention, there is provided a camera which takes normal and pseudo photographs and places characters on the film. In the case of a normal photograph, meaning one that will be used for Printing the full film frame, the characters are placed along an edge of the full frame. In the case of a pseudo photograph, such as a tele or panoramic photograph, only a smaller and central area of the film frame will be printed, and characters for a normal exposure will be outside the area to be printed. According to the invention, means are provided for moving the characters to a location along the edge of the pseudo area. If desired, the characters are also reduced in size for the pseudo photograph with its smaller area. The operations are under the control of a selector device on the camera by which the user selects the type of image to be made, that is, normal or pseudo.

BRIEF DESCRIPTION OF THE DRAWINGS

FIG. 1 is a diagrammatic sectional view through a portion of a camera showing the data printer parts in their respective positions for a normal mode photograph;

FIG. 2 is a face view of a single film frame exposed in the normal mode;

FIG. 3 is a view similar to FIG. 1 but with the data printer parts positioned for a pseudo mode exposure;

FIG. 4 is a face view of a single frame of film exposed in a pseudo mode, and indicating the position and reduced area of a pseudo tele and pseudo pan exposure, the data on the film being moved into such reduced area and reduced in size from that of the normal exposure.

DESCRIPTION OF THE PREFERRED EMBODIMENT

Figure 5:
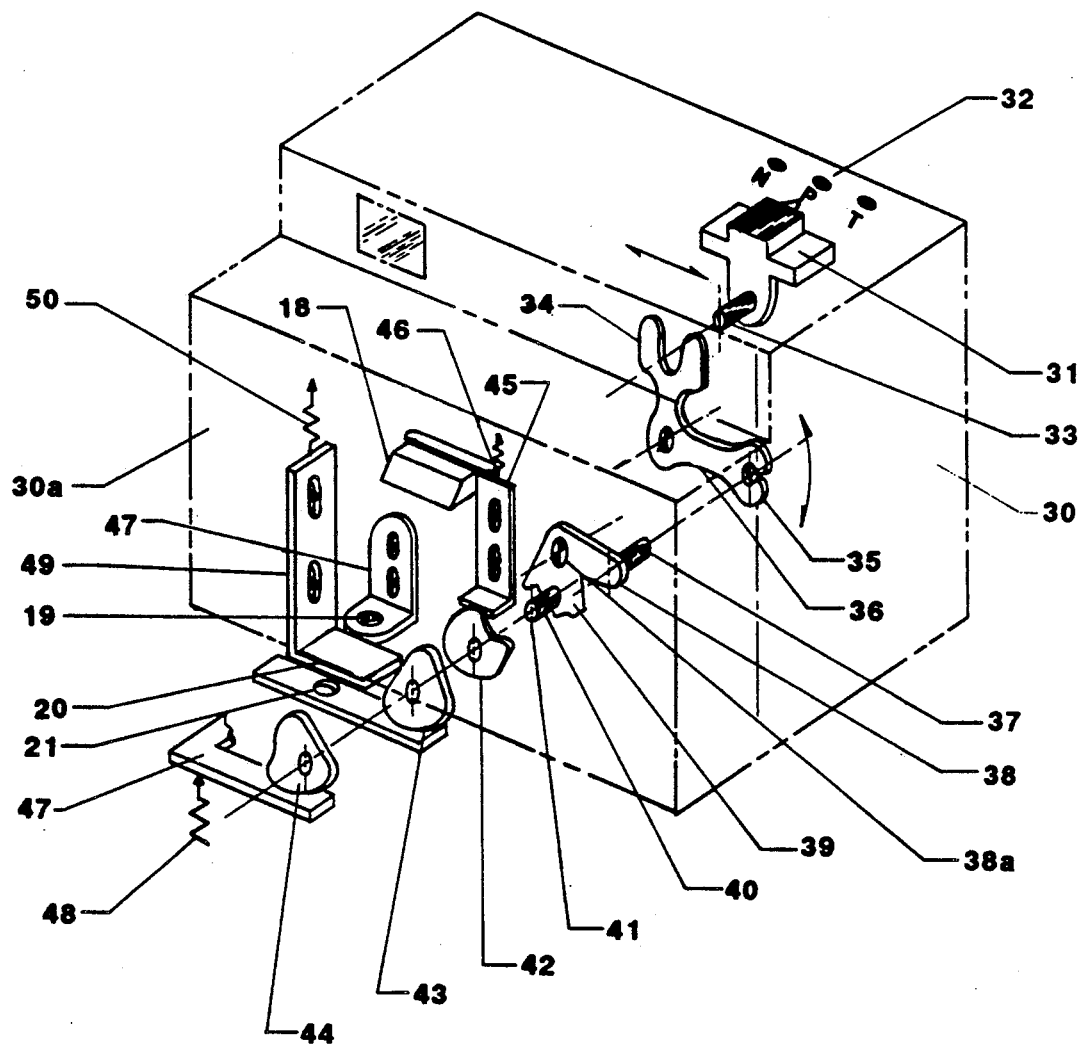
FIG. 5 is an exploded perspective view of a camera with mechanism for carrying out the invention.

I have shown in very simplified form in FIG. 1 a camera portion 10, a taking lens 11 with shutter 12 and diaphragm 13. Film is shown at 14, the film being pressed into the exposure plane by a pressure plate 15. The pressure plate has an elongated data receiving opening 16 near the edge of the film frame, and a second such opening 17 located inwardly toward the center of the frame from opening 16.

Behind the pressure plate 15 is a mirror 18 located in this instance in proximity to opening 16, a lens 19, an LCD character generator 20 and a light source 21. The LCD device and the light source are shown bracketed together as they move as one, as will be explained below.

FIG. 2 shows a film frame exposed with the parts in the positions shown in FIG. 1 for a normal type exposure the data 22 being projected through opening 16 and therefore is located along and near the edge 23 of the full film frame.

In FIG. 3 data is being projected through opening 17, as the camera selector has been set for a pseudo tele or Pseudo pan photograph. Mirror 18 has been moved downwardly as seen in this figure so that it is proximate to opening 17, lens 19 has been moved upwardly, and the LCD character generator and light source have been moved upwardly together, the normal positions being indicated at 18a, 19a, and 20a, respectively. In this position the data has been moved and the characters reduced in size.

FIG. 4 shows a film frame exposed in the pseudo tele or pseudo pan mode, the dotted lines 25 indicating the area used for the pan exposure, and the lines 25 and 26 indicating the area used with the lines 25 borders for a tele exposure. Fiducials on the film are shown at 27. These are for indicating to the printer what type of exposure was made but form no part of the present invention.

FIG. 5 shows in more detail, although somewhat schematically, a preferred means for carrying out the invention. A camera body is shown at 30 with a mode selector 31 slidable along an upper surface of the camera and movable by the user to select the exposure mode by its cooperation with indicia 32. The camera body is extended behind the film passageway and pressure plate to accommodate mechanism for moving the parts of the data printing device. These parts are mounted on one or more camera walls 30a. A viewfinder is indicated at 30b and the taking lens (not shown) is on the side of the camera facing away from the viewer.

Selector 31 carries a short shaft 33 which engages one arm 34 of a bell crank lever 35. The other arm 36 of the bell crank lever engages shaft 37 which is attached to one arm 38 of a second bell crank lever 38a, the other arm of which is formed with gear teeth 39. These teeth cooperate with a gear 40 which is fixed to a rotatably mounted shaft 41 on which are fixed cams 42, 43 and 44.

Mirror 18 is mounted to move up and down by a pin and slot mounting of its support 45 which is biased downwardly by spring 46 so that it is pressed against cam surface 42. The pins of the various pin and slot mountings are fixed to a camera wall 30a. Lens 19 is similarly mounted on a sliding, pin and slot supported bracket 47 and is biased upwardly against cam 44 by spring 48. The LCD 20 and light source 21 are carried by the same bracket 49 which has a pin and slot mounting and is biased upwardly against cam 43 by spring 50.

The parts are so arranged that when the selector 31 is in its normal mode position, the parts are in the positions shown in FIG. 1. When moved to a pseudo mode position, the selector causes the parts to move to the positions indicated in FIG. 3 if it is desired to reduce the size of the characters on the film. Cams 42, 43, and 44 are such that there is no change in the character size or location between pseudo pan and tele modes, but only between normal mode and a pseudo mode.

If it is desired to move the characters without changing character size, the entire optical system moves as one, maintaining the same separations between the various elements in both the normal and pseudo modes, and the cams in FIG. 5 are so configured.

In order to produce sharp images of the LCD characters at more than one magnification, the conjugates of the optical system must change in accordance with the equation $$1/f = 1/p + 1/q$$

where f is the focal length of the lens, p is the LCD-to-lens distance, and q is the lens-to-film distance. The magnification ratio of LCD character size-to-film character size is p/q.

I have avoided complicating the disclosure by disclosing means for energizing the light source and LCD display as these means are well known, for example in the prior art mentioned at the beginning of this specification.

Finally, the invention has been described with reference to a preferred embodiment, it will be understood that various modifications may be made within the ordinary skill of the art without departing from the scope of the invention.

I claim:

1. In a camera which takes photographs of different types, including normal and pseudo photographs, the Pseudo photographs utilizing a film frame area smaller than a normal photograph, a device for printing characters on the film, comprising:
   a film pressure plate located behind the film plane and having a first opening within the normal film exposure area near one edge thereof, and a second opening spaced from said first opening and within the film frame area of a pseudo photograph,
   character forming means,
   a light source,
   a lens, and
   a mirror for reflecting through one of said openings onto the film, light projected through said character forming means and lens.

2. A device for printing characters on film as set forth in claim 1, and means for moving said character forming means, light source, lens and mirror between first positions for projecting characters through said first opening when a normal type photograph is selected, and second positions for projecting characters through said second opening when a pseudo type photograph is selected.

3. A device as set forth in claim 2, and means for moving said light source character forming means, mirror and lens to reduce the size of the characters when a pseudo type photograph is selected.

4. A device as set forth in claim 2, and cam means for causing coordinated movement of said light source, character forming means, lens and mirror.

5. A data printing device for a camera which takes photographs of the normal type and of the pseudo type, the latter type utilizing a smaller area of the film frame than the normal type, said camera having selector means by which the user sets the camera for a normal photograph or a pseudo photograph, said device comprising:
   a character projection device comprising means for generating characters, a mirror proximate to the film area where the characters are to be printed, a lens between the character generating means and the mirror, and a light source on the other side of the character generating means, to send light through said character generating means, through said lens to said mirror, and thence to the film, and
   means controlled by said selector means to cause relative movement of the elements of said projection device to change the location and size of the characters projected onto the film when said selector means is moved between its normal and pseudo positions.

6. A data printing device according to claim 5, wherein said last mentioned means of claim 5 comprises:
   a bell crank linkage to convert movement of said selector means to rotational shaft movement,
   mounting means providing reciprocatory mobility for elements of said character generating device, and
   cam means operable by said rotational shaft movement for moving (a) the light source, character generator and lens toward the mirror, and (b) moving the mirror toward the light source, character generator and lens when the selector is moved to a pseudo position, and for moving (a) and (b) away from each other when the selector is moved to a normal position.

7. A data printing device according to claim 6, the camera having a film pressure plate located behind the film plane, said plate having an opening along an edge portion of the normal image area of the film and a second opening along an edge portion to a pseudo image area of the film, said mirror being positioned for projecting characters through said first opening when said selector is in the normal image position, and being positioned for projecting characters through said second opening when said selector is in a pseudo position.

8. A data printing device for a camera which takes photographs of the normal type and of the pseudo type, the latter type utilizing a smaller area of the film than the normal type, said camera having selector means by which the user sets the camera for a normal photograph or a pseudo photograph, said device comprising:

- a character projection device comprising means for generating characters, a mirror proximate to the film area where the characters are to be printed, a lens between the character generating means and the mirror, and a light source on the other side of the character generating means from the mirror, such that light from said source passes through said character generating means, through said lens to said mirror, and thence to the film, and
- means controlled by said selector means to cause movement of the elements of said projection device to change the location of the characters on the film when said selector means is moved between its normal and pseudo positions, said means controlled by said selector means comprising:
- a bell crank lever operated by said selector,
- a shaft rotated by said bell crank lever,
- mounting means providing reciprocatory mobility for the elements of said character generating device, and
- cam means operated by said shaft for moving the elements of said character generating means.

9. A data printing device for a camera which takes photographs of different types, including normal and pseudo photographs, the pseudo photographs utilizing a film frame area smaller than a normal photograph, said device comprising:

- means for displaying characters to be printed on the film,
- user operated means by which the user selects the type of photograph to be produced, and
- means under the control of said user operated means, including optical elements and means for moving said optical elements, for assuring that the displayed characters appear within the film frame area of the selected type of photograph.

10. A data printing device as set forth in claim 9, said device including liquid crystal devices as part of said character displaying means, said last mentioned means of claim 15 including a projection device comprising a light source, lens and mirror to project the characters onto the film, and means for adjusting the elements of said projection device to print characters of a first size for a normal type of photograph and smaller characters within the film area of a pseudo type of photograph when such pseudo type is selected.

* * * * *

UNITED STATES PATENT AND TRADEMARK OFFICE
CERTIFICATE OF CORRECTION

PATENT NO. : 4,994,830

DATED : February 19, 1991

INVENTOR(S) : Donald M. Harvey, David G. Smart and Roger C. Covington

It is certified that error appears in the above-identified patent and that said Letters Patent is hereby corrected as shown below:

Column 1, line 27, after e.g. "3 2/3:5" should read --3 1/2:5--.

Signed and Sealed this

Sixth Day of October, 1992

Attest:

DOUGLAS B. COMER

Attesting Officer     Acting Commissioner of Patents and Trademarks